(12) United States Patent
Barnetson et al.

(10) Patent No.: US 9,468,060 B2
(45) Date of Patent: Oct. 11, 2016

(54) ANSI REFERENCE BALLAST COMPLIANCE CIRCUIT FOR LED RETROFIT LAMPS

(71) Applicant: Lunera Lighting, Inc., Anaheim, CA (US)

(72) Inventors: Don Barnetson, San Jose, CA (US); Daryl Cheim, San Jose, CA (US); Josef Kirmeier, Anaheim, CA (US); Ben Wang, Anaheim, CA (US)

(73) Assignee: LUNERA LIGHTING, INC., Santa Clara, CA (US)

( * ) Notice: Subject to any disclaimer, the term of this patent is extended or adjusted under 35 U.S.C. 154(b) by 0 days.

(21) Appl. No.: 14/637,397

(22) Filed: Mar. 4, 2015

(65) Prior Publication Data

US 2016/0262220 A1 Sep. 8, 2016

(51) Int. Cl.
H05B 33/08 (2006.01)
F21K 99/00 (2016.01)

(52) U.S. Cl.
CPC .............. *H05B 33/083* (2013.01); *F21K 9/17* (2013.01); *H05B 33/0812* (2013.01); *H05B 33/0815* (2013.01); *H05B 33/0887* (2013.01)

(58) Field of Classification Search
CPC ............ H05B 33/083; H05B 33/0812; H05B 33/0815; H05B 33/0887; F21K 9/17
USPC ........................................................ 315/122
See application file for complete search history.

(56) References Cited

U.S. PATENT DOCUMENTS

| | | |
|---|---|---|
| 5,099,176 A | 3/1992 | Fellows |
| 5,519,289 A | 5/1996 | Katyl |
| 5,825,139 A | 10/1998 | Nuckolls |
| 8,350,494 B2 | 1/2013 | Snook |
| 8,807,785 B2* | 8/2014 | Ivey .......................... F21K 9/17 362/217.02 |
| 2012/0161666 A1* | 6/2012 | Antony .............. H05B 33/0809 315/294 |
| 2014/0203716 A1* | 7/2014 | Tao ..................... H05B 33/0803 315/186 |
| 2014/0265900 A1* | 9/2014 | Sadwick ............ H05B 33/0803 315/200 R |
| 2014/0320007 A1* | 10/2014 | Stamm ............... H05B 33/0815 315/51 |
| 2014/0328065 A1 | 11/2014 | Barnetson |
| 2014/0328066 A1* | 11/2014 | Barnetson ................. F21K 9/10 362/294 |
| 2015/0021988 A1 | 1/2015 | Barnetson |

(Continued)

OTHER PUBLICATIONS

Hu, Yongxuan, Analysis and Design of High-Intensity-Discharge Lamp Ballast for Automotive Headlamp, Thesis submitted to the Faculty of the Virginia Polytechnic Institute and State University (Nov. 19, 2001).

(Continued)

*Primary Examiner* — Dylan White
(74) *Attorney, Agent, or Firm* — Henry J. Cittone; Cittone & Chinta LLP

(57) ABSTRACT

An embodiment of the present invention provides a retrofit LED lamp that is operated by a dual mode circuit, enabling maximum compatibility with the ANSI reference ballasts to satisfy UL requirements to replace HID and fluorescent lamps. The LED lamp operates at two different modes, offered by the dual mode PCB circuit. In one of the mode, namely ANSI ballast testing, a low frequency current from the ballast is throttled through a bypass circuit to LEDs, since a field effect transistor of the circuit is in open circuit mode due to insufficient current. During the second mode, namely field ballast operation, a high frequency current is provided by the ballast, which short circuits the FET, causing it to conduct and thus operating the LEDs. Advantageously, the LED lamp offers maximum compatibility with ballasts using such dual mode circuit and consumes less power.

17 Claims, 3 Drawing Sheets

(56) References Cited

U.S. PATENT DOCUMENTS

| | | |
|---|---|---|
| 2015/0049490 A1 | 2/2015 | Barnetson |
| 2015/0061542 A1* | 3/2015 | Hsia ........................ F21V 25/04 315/294 |
| 2015/0252958 A1 | 9/2015 | Barnetson |
| 2015/0260384 A1* | 9/2015 | Purdy ................ H05B 33/0815 362/221 |
| 2015/0296586 A1* | 10/2015 | Williams ........... H05B 37/0245 315/161 |
| 2015/0334795 A1* | 11/2015 | Strijker .............. H05B 33/0815 315/291 |
| 2015/0359059 A1* | 12/2015 | Barnetson .......... H05B 33/0845 315/186 |
| 2015/0366008 A1 | 12/2015 | Barnetson |
| 2016/0128154 A1 | 5/2016 | Barnetson |

OTHER PUBLICATIONS

PSEG, Energy Efficient Fluorescent Ballasts—A Pacific Energy Center Factsheet, (May 1997).

Atmel Corporation, AT89RFD-10/EVLB002 Non Dimmable Fluorescent Ballast, Ballast Demonstrator User Guide IXDN0037, Apr. 2006, Sections 1-6, pp. 1-28, 7629A-AVR.

* cited by examiner

ANSI REFERENCE BALLAST COMPLIANCE CIRCUIT FOR LED RETROFIT LAMPS

FIELD OF THE INVENTION

The present invention relates to the field of illumination using fluorescent and light-emitting diode ("LED") lamps. More particularly, the invention relates to an electric circuit for the operation of the lamps to increase their compatibility with the ballasts present in the market.

BACKGROUND

A lamp is an energy converter. Although it may carry out secondary functions, its prime purpose is the transformation of electrical energy into visible electromagnetic radiation. There are various types of lamps that are available in the market namely incandescent lamp, high intensity discharge lamp, tungsten halogen lamps, tubular fluorescent lamps, compact fluorescent lamps, induction lamps, mercury lamps, metal halide lamps, sodium lamps and many more.

A fluorescent lamp or a fluorescent tube is a low pressure mercury-vapor gas-discharge lamp that uses fluorescence to produce visible light. High-intensity discharge lamps (HID lamps) are a type of electrical gas-discharge lamps that produce light by means of an electric arc, which is between tungsten electrodes that are in-turn housed inside a translucent or transparent fused quartz or fused alumina arc tube. These lamps require ballast. The ballast is a device intended to limit the amount of current in an electric circuit. For example, inductive ballast is used in fluorescent lamps, to limit the current through the tube.

These lamps are designed under the American National Standards Institute ("ANSI") standard. ANSI standard describes the essential design features and operating characteristics of reference ballasts for fluorescent and other lamps.

The traditional ballasts function as constant current sources. Many lamps use such ballasts to maintain the input current. The retrofit lamps seek to consume less power, thus they typically function at the same current and a lower voltage than the legacy lamps they are replacing. This generally works well with actual ballasts in the field. However, ANSI ballast test defines a thevenin equivalent circuit that is equivalent to ballasts. Thus, when a low voltage lamp, like retrofit lamp, is provided to the ANSI reference thevenin equivalent ballast, it increases the input current that in-turn violates the Underwriters Laboratories (UL) ANSI Ballast requirement.

The prior art technologies fail to disclose the design circuits for the LED lamps that are satisfying the operational characteristics as per UL ANSI standards. Further, none of the prior art technologies teach about maintaining the compatibility of the retrofit LED lamps with the ballasts present in the market to replace fluorescent or HID lamps.

Furthermore, there are several problems with traditional lamp circuits. When a low voltage lamp is presented to ANSI reference ballast, it increases the current, hence violates the UL requirement. Similarly, power consumption is more in the traditional lamps.

Also, when a traditional approach of adding a capacitive coupling between the retrofit lamp and ballast to add a reactive component to the lamp impedance and throttle back current is implemented, the approach does not work during compatibility testing for two reasons: the difference in power level that a compatible compact florescent lamp ("CFL") LED lamp is seeking to bridge (50%) is larger than what is typically bridged in HID or linear fluorescent or other lamps (20-30%). This further requires a smaller capacitance that introduces a much larger reactive component to the lamp impedance. This larger reactance creates compatibility issues with ballasts that operation at lower frequencies and its impedance is higher and thus causes the ballast to turn off after hitting its over voltage protection limit or other protection circuitry.

Further, the CFL ballasts last longer than T8 ballasts and thus the age and variety of ballasts that the LED lamp needs to support is much larger than what is required by T8 lamps. Therefore, high compatibility cannot be achieved with a simple reactive circuit.

Presently, Cree has designed and manufactured a T8 (tubular 1-inch diameter) LED fluorescent replacement lamp. In this lamp, LEDs strings with plurality of LEDs are arranged in parallel. The circuits for the components on each end of the lamp are shown in FIGS. 1A and 1B. 102 and 104 are test points on a PC board. FIG. 1A shows the circuit that connects the parallel strings of LEDs through a resistor R1. Points 106 and 108 are the shorted returns on the ballast. FIG. 1B shows the circuit for the Inductor L1/resistor R2 section. Points 202 and 204 are power from the ballast. 102 and 104 are printed circuit board ("PCB") rest points. Dimming fluorescent ballasts keep the same voltage across the lamps but lowers the current that works out well for LED lights since LEDs are current-controlled components. However, the ballasts are constant current sources.

Hence, there exists a need to design and develop a retrofit LED lamp with an electrical circuit that may increase the compatibility of the lamps with the existing ballasts, when such lamps replace the available fluorescent lamps or HID lamps, with a constant voltage source ballast. Also, there is a need to imply constant voltage source ANSI reference ballast with the retrofit LED lamps. Further, this also creates a need to reduce the power consumption during the operation of the lamps.

SUMMARY OF THE INVENTION

The present invention provides an LED retrofit lamp that efficiently replaces HID or fluorescent lamps by maximizing their compatibility with the ballasts available in the market.

It is an objective of the present invention to provide such an LED lamp with maximum compatibility with the ANSI reference ballasts that further satisfies UL requirements.

It is further an objective of the present invention to provide a reference ballast that functions as a constant voltage source.

It is another objective of the present invention to provide an LED lamp that includes one or more LEDs driven by a dual mode circuit. The dual mode circuit efficiently offers two modes of function to the LED lamp, where in one of the modes, namely ballast testing mode, the LED lamp is provided with a low frequency current waveform (25 kHz); while in the other mode, namely field ballast operation mode, the LED lamp is provided with a high frequency current waveform (40-60 kHz).

It is further an objective of the present invention to provide a retrofit LED lamp that consumes less power, without compromising with the efficiency.

It is also an objective of the present invention to provide an LED lamp that has maximum compatibility with the large installed base of ballasts in the market.

Further, an embodiment of the present invention provides the dual mode circuit for LED lamp that includes a field effect transistor (FET) and a bypass capacitor connected across the FET. The dual mode circuit allows the LED lamp to operate in two modes; in ballast testing mode with an input current at 25 kHz frequency, the FET is in open circuit, and the current from the ballast is throttled to the LEDs via a bypass capacitor and in actual field ballast operation mode with an input current at 40-60 kHz frequency, the FET is short circuited and the LED lamp is directly driven by the ballast.

Furthermore, an embodiment of the present invention provides an LED lamp to be driven by a dual mode circuit, where the dual mode circuit comprises a thevenin equivalent circuit used as an equivalent for traditional cathode heaters used in fluorescent lamps. The operating ballast with the LED lamps provides a constant voltage to the one or more LEDs of the lamp via the thevenin equivalent circuit, which provides impedance to the lamp. The dual mode circuit further comprises capacitors that couple the LEDs with the ballast, where the capacitors are not small enough to offer material reactive impedance but also allows changing the reference lamp to a single ended structure and only using a single FET to latch the lamp on or off.

Another embodiment of the present invention provides the dual mode circuit including an RC filter (resistor-capacitor circuit) and a comparator (U1A) connected across the LEDs. During the ballast testing mode, due to insufficient current, the RC filter and the comparator are not conducting, causing the FET to be in open circuit; and the current is passed via the bypass capacitor to the LEDs. LEDs of the lamp in this mode operate but at a very low power. This is referred to as "pre-latch" mode. Sufficient impedance is presented to the lamp by the thevenin circuit and the coupling capacitors; this allows the ANSI ballast tester to pass the testing mode.

A yet another embodiment of the present invention provides the actual field ballast operation mode of the dual circuit for LED lamp. During this mode, a high current is passed through the circuit via the ballast, at 40-60 kHz. High frequency current is passed through the bypass capacitor. Therefore, LEDs operate at a high power; the RC filter and the comparator start conducting, causing the FET to short circuit. Resultantly, the FET starts conducting current, and the LEDs of the lamp are directly driven by the FET. This is referred to as a "latch" mode.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DETAILED DESCRIPTION OF THE EMBODIMENTS

In the following detailed description of embodiments of the invention, numerous specific details are set forth in order to provide a thorough understanding of the embodiment of invention. However, it will be obvious to a person skilled in art that the embodiments of the invention may be practiced with or without these specific details. In other instances well known methods, procedures and components have not been described in detail so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention provides an LED lamp operating through a dual mode electrical circuit 300 that enables the LED lamp to have maximum compatibility with the UL ANSI ballasts available in the market. The reference ballast provided in the current invention functions as a constant voltage source rather than a constant current source. Further, in the present invention a thevenin equivalent circuit is implemented as an equivalent for the ANSI reference ballast, to provide a constant voltage source for the LED lamp to operate. The Thevenin Equivalent Circuit is used as an equivalent for traditional cathode heaters used in fluorescent lamps. Therefore, it may be interchangeably used as cathode heater equivalent.

Figure 1A:
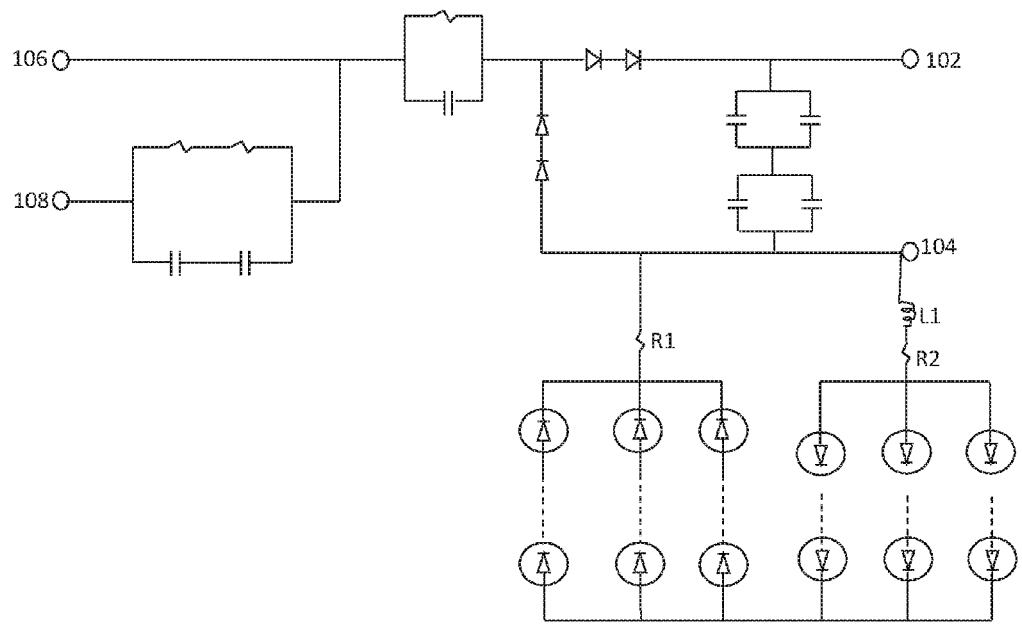
FIGS. 1A and 1B illustrate a design of the circuit for the LED lamps developed by Cree.
Figure 1B:
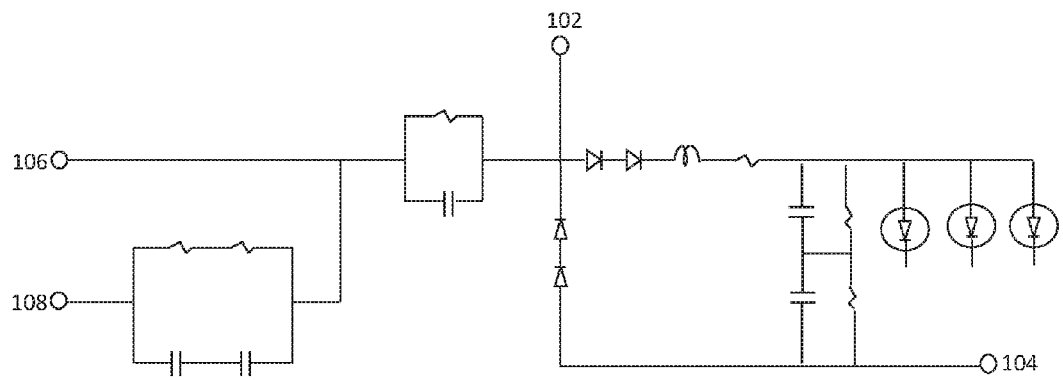
Figure 2:
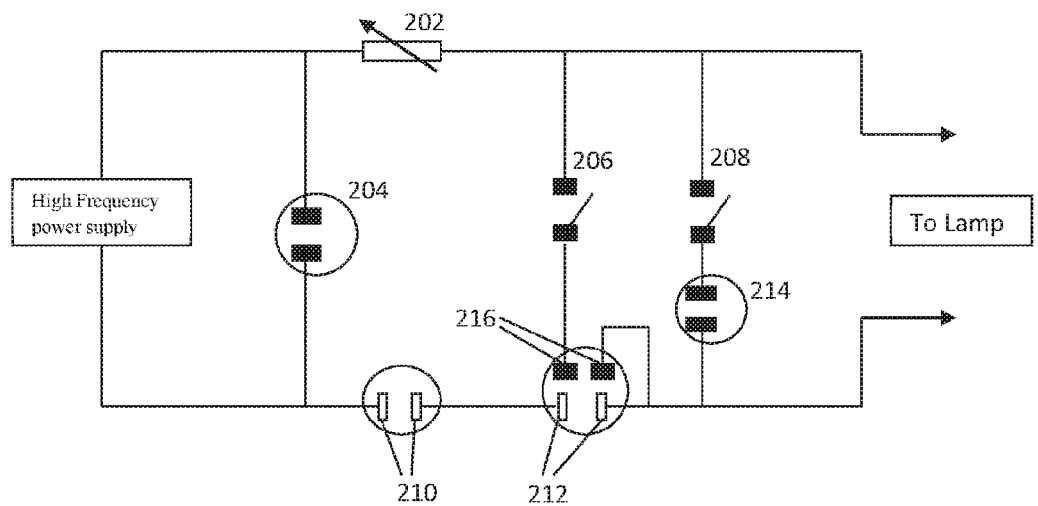
FIG. 2 illustrates a UL ANSI reference ballast from ANSI C82.3, 2002 for lamp ballasts-Reference Ballasts for Fluorescent Lamps.

FIG. 2 illustrates a UL ANSI ballast circuit. FIG. 2 is taken from C82.3-2002, American National Standards, for lamp ballasts—Reference Ballasts for Fluorescent Lamps. In the FIG. 2, a reference resistor 202 is connected with a high frequency power supply. 206 and 208 denote the switches in the circuit. The current terminals in the circuit are represented by 210 and 212; whereas the potential terminals are 204, 214 and 216. High Frequency reference ballasts may be used in a circuit employing separate power sources to heat the lamp cathodes for proper starting of the lamp. These power sources shall be disconnected when measuring a lamp.

However, while replacing a fluorescent lamp with an LED lamp, the manual re-wiring of the lamp and the ballast may be required. To avoid such requirements, compliance circuits are helpful. The present invention provides an LED lamp implementing an ANSI reference ballast compliance circuit that efficiently satisfies the UL requirement.

Figure 3:
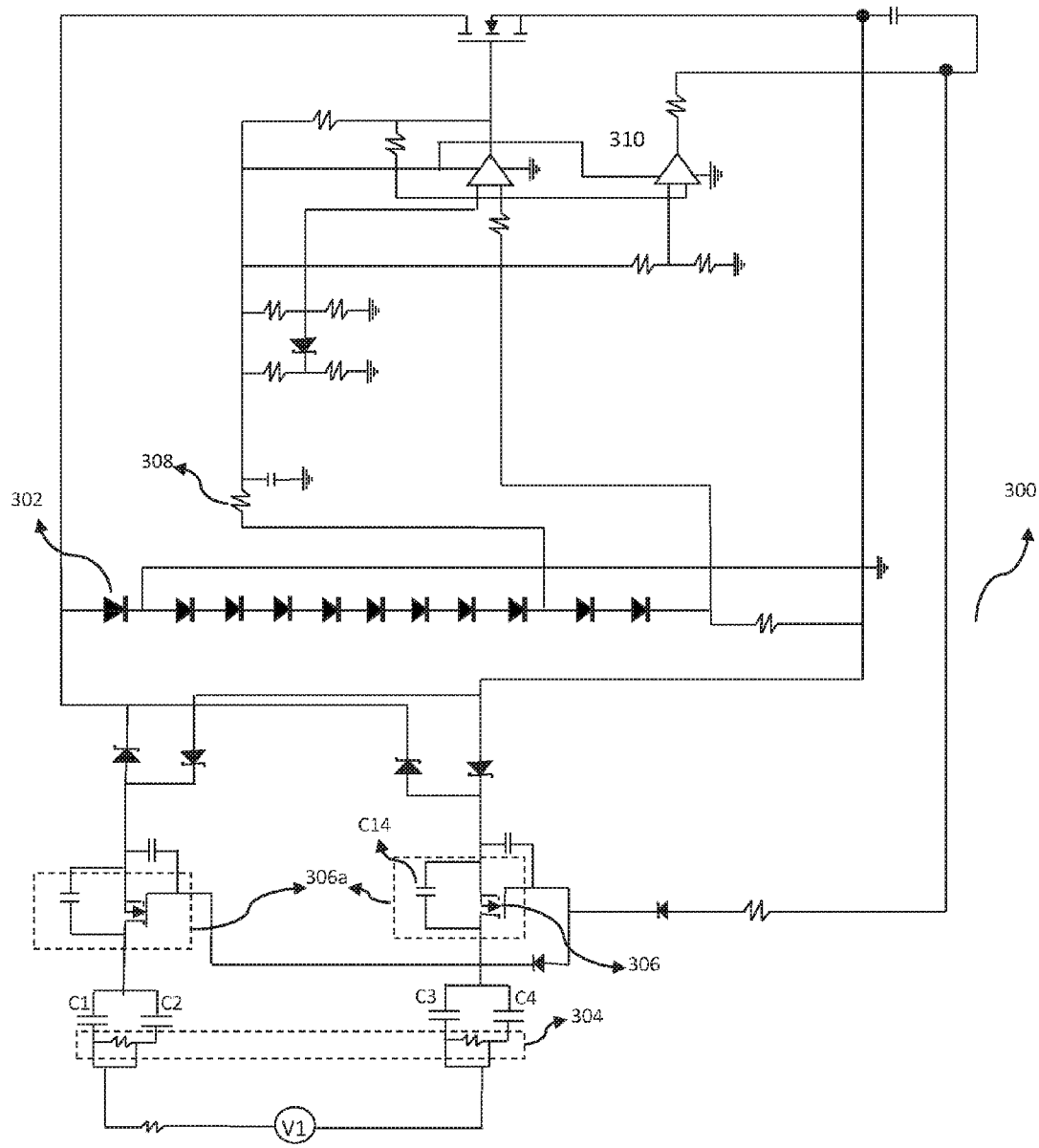
FIG. 3 illustrates a dual mode electric circuit for the operation of one or more LEDs of the retrofit LED lamp, in accordance with an embodiment of the present invention.

FIG. 3 illustrates a design of the electrical circuit 300 that helps the arrays of LEDs 302 to operate, and hence the LED lamp to illuminate, in accordance with an embodiment of the invention. The circuit 300 is used for enabling the LED lamps to replace HID or fluorescent lamps, and hence to enable compatibility of the LED lamp with the ballasts. As known in the prior technology, the fluorescent lamps use cathode heaters to impart initial heating of the gas inside the fluorescent lamps, where the cathode heaters are heated using a DC voltage or a low frequency source.

The four pins, shown in FIG. 3 voltage input V1, working as the input power source terminals, are further connected with the ANSI reference ballast equivalently working as a thevenin equivalent circuit, shown as 304 in FIG. 3, in order to drive the arrays of LEDs 302.

Many types of ballasts require cathode heaters to be in place in order to function properly. Using just capacitors, in the present invention, to simulate cathode heaters would transfer no power to the LEDs. Hence, the lamp would not function. Also, some ballasts use DC cathode heater voltage for functioning. Therefore, it is necessary to use a relatively high impedance resistor in parallel with a relatively low impedance capacitor in order to maximize compatibility of the replacing LED lamps with installed ballasts and thus, minimize power transfer to the lamp. Consequently, the thevenin circuit 304 reduces power consumption in the LED lamps and also offers support to those ballasts that use a DC or low frequency source to heat the cathodes of the fluorescent lamps. This thevenin circuit 304 of resistors arranged in a circuit provides thevenin equivalent circuit to the present invention.

As mentioned above, in the present invention, the cathode heaters are replicated with a combined RC circuit, including resistors: thevenin circuit 304 and capacitors.

Further, according to the circuit 300 shown in FIG. 3, the arrays of LEDs 302 are then capacitively coupled to the ballast using capacitors. The capacitors are not small enough to offer material reactive impedance but allow changing the reference LED lamp to a single ended structure and use only a single field effect transistor (FET) to latch the LED lamp on or off. In an embodiment of the present invention, the number of capacitors coupling the LED lamp to the ballast is four, arranged in a parallel connection. As shown in FIG. 3, C1, C2, C3 and C4 are the capacitors coupling the LED lamp.

According to the present invention, the electrical circuit 300 as shown in FIG. 3 offers a dual mode operation for the LED lamp to function that further helps in enabling maximum compatibility of the LED lamps with the present ANSI reference ballasts in the market. This further helps in satisfying the UL requirements. Hence, the LEDs arrays 302 operate in two modes: first mode is referred to as "ANSI ballast testing", while the other operating mode is referred to as "field ballast operation".

The electrical circuit 300, shown in the FIG. 3, further comprises two bypass circuits 306a at both the inputs. Each bypass circuit 306a includes a field effect transistor (FET), 306, and a bypass component (C14) to provide current to the LEDs array 302 in the above mentioned dual modes. Furthermore, the circuit 300 includes an RC filter, 308, and a comparator 310 in connection with the arrays of LEDs 302.

During the ANSI ballast testing mode, the operating ballast with the LED lamp is tested in order to check for compatibility. In testing mode, a low frequency current waveform is presented to the LED lamp. During this mode, the electric circuit 300 operates in limited conduction mode when exposed to a low frequency thevenin equivalent circuit 304. The thevenin equivalent circuit 304 acts as the ANSI reference ballast for the LED lamp.

Due to the insufficient current frequency through the LED lamps, the RC filter 308 and the comparator 310 connected in the circuit do not operate. This causes the FETs 306 of both the bypass circuits 306a to remain OFF as well, that means the FETs in the bypass circuits are not conducting current through it and are in an open circuit. Therefore, during the ANSI ballast testing mode, due to insufficient current through the circuit 300, the RC filter 308, the comparator 310 and the FETs are not operating.

This is a "pre-latch" mode of operation, where the LED lamp presents higher circuit impedance, through the RC combination circuit including the thevenin circuit 304 and the capacitors. Since impedance is a function of frequency, where impedance increases with decreasing capacitance and decreasing frequency and vice versa. Therefore, at a lower current frequency, the RC combination circuit offers higher impedance. Higher impedance continues until a sufficient threshold of conduction has been reached to bring the RC filter 308 into regulation, and turn on the comparator 310 and thus the FETs. This is done to keep the LED lamp in the "pre-latch" mode during ANSI ballast testing to present sufficient impedance to the ANSI ballast tester to pass the test.

Therefore, in the situation when FETs 306 are in open circuit and not conducting, the only path to conduct current and drive the arrays of LEDs 302 is through the bypass component that is a capacitor (C14), which is connected across the FET 306. The low frequency current waveform is presented to the LED lamp by effectively throttling the current using bypass capacitor C14. The LEDs are still working but at a low level of power of what is actually required for an LED lamp to illuminate completely. The same holds for both the bypass circuits (306a).

In an embodiment, during the ANSI ballast testing mode, a 25 kHz, 270V rms current waveform is applied to the LED lamp. The circuit operates in a limited conduction mode when exposed to a 25 kHz thevenin equivalent circuit, acting as an equivalent ballast defined by ANSI, with a reactive throttle containing maximum current.

Once the ANSI reference ballast passes the test in the first mode, it is considered to be compatible with the LED lamp. Therefore, after the ANSI ballast testing mode, the dual mode circuit 300 offers "field ballast operation mode" to the LED lamp. During the field ballast operation mode, a high frequency current is applied across the arrays of LEDs 302. As mentioned above, impedance is a function of frequency, thus in a field ballast operation, a high current frequency lowers the impedance offered by the RC combination circuit (thevenin circuit 304). Hence, high current starts to flow through the circuit, and coupling through the bypass capacitors is much higher in this mode. Now, sufficient current has been conducted through the pre-latch mode to operate the arrays of LEDs 302 through the coupling capacitors and further to bring the RC filter 308 and the comparator 310 into regulation.

Thereafter when RC filter 308 and the comparator 310 are regulated, the current drives and the FETs 306 are, resultantly, short circuited. This causes the FETs 306 to conduct, and thus allowing the LED lamp to be directly driven by the ballast. Hence, in the field ballast mode, the current is passed through the FETs 306, which drives the arrays of LEDs 302 and hence generates illumination.

Therefore, in the field ballast mode, the arrays of LEDs 302, RC filter 308, the comparator 310, and hence the FETs 306 are operating, and the LED lamp is now referred to operate in a "latched" state. In an embodiment of the present invention, during the field ballast operation, the ballasts operate at 40-60 kHz, providing higher current frequency through the circuit 300 shown in FIG. 3. The LED lamp is capacitively coupled to the ballast, thus the lamp impedance is a function of frequency. Therefore, at higher frequencies (40-60 kHz of a "real" ballast) the LED lamp is more conductive and more likely to latch; whereas at lower frequency (25 kHz) of the ANSI ballast, it is much less conductive and less likely to "latch".

In an embodiment of the present invention, the dual mode circuit 300 includes a bipolar junction transistor to latch the LED lamp on or off, and further to allow the LED lamp to be directly driven by the ballast when operating in field ballast operation mode.

Conclusively, the present invention provides an LED lamp that is able to operate in dual mode, while enabling maximum compatibility with the ANSI reference ballasts, and hence is successful in replacing fluorescent lamps. The arrays of LEDs 302 comprised in the lamp are mounted on a PCB circuit 300, where the PCB circuit 300 provides operation in dual mode, namely, ANSI ballast testing mode and field ballast operation mode. As described above, during the ANSI ballast testing, at lower frequency of current, the LED lamps work in "pre-latch" mode. Whereas, during the field ballast operation, at higher frequency of current, the LED lamp works in the "latch" mode.

Advantageously, the circuit reduces the power consumption in the LED lamp without compromising with the illumination generated. Further, the electrical circuit of the present invention offers maximum compatibility with the available ANSI ballasts in the market, and hence allows the LED lamps to effectively replace fluorescent lamps. Furthermore, the present invention satisfies the UL requirement by enabling compatibility of the ANSI ballasts with the LED retrofit lamps using a dual mode circuit.

We claim:

1. A retrofit LED lamp operating compliant with UL ANSI reference ballasts comprising:
   one or more LEDs mounted on a dual mode PCB circuit to generate illumination; and
   the dual mode PCB circuit to enable operation of the said LEDs, the said circuit providing input current to the LEDs at two modes of operation including: a ballast testing mode, where a 25 kHz waveform is presented to the LEDs via at least one Thevenin Equivalent Circuit in order to throttle the current inputted to the LEDs; and a field operation mode, where the ballasts operate at a current frequency range of 40-60 kHz, driving the one or more LEDs of the LED lamp.

2. The retrofit LED lamp of claim 1, wherein the dual mode PCB circuit further comprises an RC filter or RC circuit and a comparator or operational amplifier connected across the one or more LEDs.

3. The retrofit LED lamp of claim 1, wherein the dual mode PCB circuit when operating in the ballast testing mode, the current waveform from the Thevenin Equivalent Circuit is bypassed across a Field Effect Transistor (FET) using a bypass capacitor; making the RC filter and the comparator to remain OFF; further causing the FET in open circuit and throttling the current to the one or more LEDs through the bypass capacitor.

4. The retrofit LED lamp of claim 1, wherein the dual mode PCB circuit when operating in the field operation mode, the bypass capacitor is fed with a high frequency current ranging between 40-60 kHz; regulating the RC filter and comparator; short circuiting the FET in result; and driving the one or more LEDs of the LED lamp.

5. The retrofit LED lamp of claim 1, wherein the Thevenin Equivalent Circuit acting as cathode heater equivalent circuit further comprises combination of resistors to reduce power consumption in the LED lamp and provides support to the ballast that uses a DC or low frequency source for heating fluorescent or HID lamps.

6. The retrofit LED lamp of claim 1, wherein the dual mode PCB circuit further includes capacitors to couple the LED lamp with the UL ANSI reference ballast and the cathode heater equivalent circuit, enabling one or more FET to latch the LED lamp between a high impedance low brightness case and a low impedance high brightness case.

7. The retrofit LED lamp of claim 1, wherein the dual mode PCB circuit can include one or more Bipolar Junction Transistors to latch the LED lamp between a high impedance low brightness case and a low impedance high brightness case.

8. An LED retrofit lamp compliant with ballast of the said fluorescent or HID lamps, the LED lamp comprising:
   one or more LEDs for generating illumination; and
   a dual mode PCB circuit for operation of the one or more LEDs, the circuit comprises one or more bypass circuits including field effect transistor (FET) to latch the LED lamp between a high impedance low brightness case and a low impedance high brightness case; and a bypass component connected across the field effect transistor (FET) to throttle an input current to the one or more LEDs when the FET is in open circuit; and
   where the dual mode PCB circuit provides input current at two modes of operation including:
   a ballast testing mode, where a 25 kHz current waveform is presented to the one or more LEDs via a cathode heater equivalent circuit in order to keep the FET in open circuit and throttle the current inputted to the one or more LEDs through the bypass circuit; and
   a field operation mode, where the ballasts operate at a current frequency range of 40-60 kHz, short circuiting the FET and driving the one or more LEDs.

9. The retrofit LED lamp of claim 8, wherein the dual mode PCB circuit further comprises an RC filter or an RC equivalent circuit and a comparator connected across the one or more LEDs.

10. The retrofit LED lamp of claim 8, wherein the dual mode PCB circuit when operating in the ballast testing mode, the RC filter and the comparator do not regulate; further causing the FET in open circuit and throttling the current to the one or more LEDs through the bypass component.

11. The retrofit LED lamp of claim 8, wherein the dual mode PCB circuit when operating in the field operation mode, the bypass circuit is fed with a high frequency current ranging between 40-60 kHz; regulating the RC filter and the comparator; short circuiting the FET in result; and driving the one or more LEDs of the LED lamp.

12. The LED lamp of claim 8, wherein the cathode heater equivalent circuit comprises combination of resistors and capacitors to reduce power consumption in the LED lamp and provides support to the ballast using a DC or low frequency source for heating fluorescent or HID lamps.

13. The LED lamp of claim 8, wherein the dual mode PCB circuit further includes capacitors to couple the LED lamp with the ballast and the cathode heater equivalent circuit, enabling single FET to latch the LED lamp on or off.

14. The LED lamp of claim 8, wherein the bypass circuit in the dual mode PCB circuit includes a capacitor connected across the FET.

15. The retrofit LED lamp of claim 8, wherein the dual mode PCB circuit can include one or more Bipolar Junction Transistor to latch the LED lamp on or off.

16. The LED lamp of claim 8, wherein the ballasts are UL ANSI reference, and the PCB dual mode circuit operates being compatible with the UL ANSI standards.

17. The LED lamp of claim 8, wherein the LED lamps are retrofit lamps and can replace any conventional gas discharge lamps.

* * * * *